(12) United States Patent
Dietze et al.

(10) Patent No.: US 12,424,709 B2
(45) Date of Patent: Sep. 23, 2025

(54) BATTERY ELECTRIC SYSTEM WITH MULTI-LEVEL BUSBAR

(71) Applicant: GM GLOBAL TECHNOLOGY OPERATIONS LLC, Detroit, MI (US)

(72) Inventors: Robert H. Dietze, Brighton, MI (US); Tyler J. Murphy, Bloomfield, MI (US); Daniel J. Casoli, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 877 days.

(21) Appl. No.: 17/669,694

(22) Filed: Feb. 11, 2022

(65) Prior Publication Data

US 2023/0261330 A1    Aug. 17, 2023

(51) Int. Cl.
*H01M 50/507* (2021.01)
*H01M 50/204* (2021.01)
*H01M 50/516* (2021.01)
*H01M 50/522* (2021.01)
*H01M 50/536* (2021.01)

(52) U.S. Cl.
CPC ....... *H01M 50/507* (2021.01); *H01M 50/204* (2021.01); *H01M 50/516* (2021.01); *H01M 50/522* (2021.01); *H01M 50/536* (2021.01); *H01M 2220/20* (2013.01)

(58) Field of Classification Search
CPC ............. H01M 50/507; H01M 50/516; H01M 50/522; H01M 50/204; H01M 50/536; H01M 2220/20
See application file for complete search history.

(56) References Cited

U.S. PATENT DOCUMENTS

| | | | | |
|---|---|---|---|---|
| 2005/0100784 A1* | 5/2005 | Yageta | ................ | H01M 50/178 |
| | | | | 429/162 |
| 2016/0133908 A1* | 5/2016 | Zhao | .................. | H01M 50/503 |
| | | | | 429/90 |
| 2019/0305284 A1* | 10/2019 | Lee | ........................ | H01M 50/50 |
| 2020/0313475 A1* | 10/2020 | Fatemi | ..................... | H02K 3/28 |
| 2020/0321595 A1* | 10/2020 | Kim | ..................... | H01M 50/561 |
| 2021/0384589 A1* | 12/2021 | Kojima | ............... | H01M 10/482 |
| 2022/0200101 A1* | 6/2022 | Lee | ...................... | H01M 50/505 |
| 2022/0399615 A1* | 12/2022 | Hwang | ................ | H01M 50/211 |

\* cited by examiner

*Primary Examiner* — Matthew T Martin
*Assistant Examiner* — Taylor Harrison Krone
(74) *Attorney, Agent, or Firm* — Quinn IP Law

(57) ABSTRACT

A multi-level busbar for interconnecting flexible cell tabs within a battery module of a battery electric system, e.g., of a motor vehicle having a traction motor and road wheels, includes first and second busbar surfaces and an elongated step transition. The first busbar surface is arranged at a first level of the busbar and is configured to be welded to a first tab group of the cell tabs. The second busbar surface is arranged at a second level of the busbar, and configured to be welded to a second tab group of the cell tabs. The step transition has a height dimension configured to allow the first and second tab groups to overlap when folded against and welded to the busbar.

20 Claims, 6 Drawing Sheets

BATTERY ELECTRIC SYSTEM WITH MULTI-LEVEL BUSBAR

INTRODUCTION

Multi-cell electrochemical batteries are used in a host of battery electric systems for the purpose of storing and releasing power to a connected load. Lithium-ion battery cells in particular operate by reversibly passing lithium ions between battery electrodes, i.e., an anode and a cathode. The electrodes are situated on opposite sides of a porous polymer separator, with the separator emersed in an electrolyte solution configured to conduct the lithium ions. Electrode extensions protrude from a body of a given battery cell to form accessible connection points when electrically interconnecting the battery cells. In a typical pouch-style or prismatic battery cell, for example, the electrode extensions may take the form of flexible foil tabs.

Busbars are solid current-carrying bars of copper or another suitable electrical conductor such as aluminum. Due to their increased surface area and low profile relative to cylindrical electrical wires or cables, busbars are able to conduct much more current, a quality that renders busbars optimal for use in forming connections in high-voltage battery electric systems. When using busbars in conjunction with the above-noted flexible cell tabs, the busbars are typically arranged on an external surface of a battery module, with the flexible cell tabs gently folded onto the busbars from opposing sides thereof. The folded cell tabs are then conductively joined to the busbars, typically using a laser welding process.

SUMMARY

The concepts described in detail herein pertain to conductive busbars for use in a battery electric system having a battery module with flexible metal cell tabs. Formation of high-quality, structurally robust welds requires the folded cell tabs to lie perfectly flat against the busbar. As the construction of typical battery module provides limited packaging space both on and around the exposed busbar surfaces, it is often difficult to accommodate cell tabs of different lengths. For instance, overly lengthy cell tabs will tend to overlap and interfere with one another. Conversely, insufficient surface area of the folded cell tabs may remain for welding to the busbars in the event the cell tabs are trimmed too short. The present solutions are therefore intended to address this potential manufacturing problem, with the solutions coming in the form of a busbar construction having multiple tiers or levels as set forth in detail below.

As appreciated in the art, busbars for use in high-voltage propulsion battery packs for battery electric vehicles and other high-energy systems traditionally present a single-level flat surface for welding of the cell tabs. However, single-level busbar configurations tend to restrict the length of the cell tabs while reducing positional tolerances, e.g., when assembling battery cells into a battery module or multi-module battery pack. In contrast, the multi-level busbar constructions contemplated herein enable longer cell tabs to overlap without interfering with apposing cell tabs, i.e., specifically at or along a center region of the busbar. This feature allows the cell tabs to lie completely flat on the busbar, a posture which in turn enables tab-to-busbar welds of high structural integrity and a long useful service life. As a result, the need to trim the cell tabs during a battery module assembly process is reduced along with associated scrap rates.

In an exemplary embodiment described in detail herein, a multi-level busbar for interconnecting flexible cell tabs within a battery module of a battery electric system includes first and second busbar surfaces and an elongated step transition. The first busbar surface is arranged on a first tier or level of the busbar, and is configured to be welded or otherwise conductively joined to a first tab group of the flexible cell tabs when the first tab group has been folded against the first busbar surface. The second busbar surface, which is arranged on a second level of the busbar, is configured to be welded to a second tab group of the flexible cell tabs, which occurs after the second tab group has been folded against the second busbar surface. The elongated step transition separates the first and second levels, and has a height dimension configured to allow the first and second tab groups to overlap one another prior to welding the first and second tab groups to the busbar.

In an aspect of the disclosure, the first tab group has a first thickness, the second tab group has a second thickness, and the height dimension of the elongated step transition exceeds a larger of the first and second thicknesses. The larger of the thicknesses is less than about 3 mm in a non-limiting exemplary embodiment.

The first busbar surface may define through-holes each configured for mounting the busbar to a mounting surface of the battery module.

In a possible configuration, the first busbar surface is parallel to the second busbar surface, analogous to parallel stair treads of two adjacent stairs of a typical staircase. Alternatively, the first busbar surface is arranged at an angle with respect to the second busbar surface to form a ramp, e.g., about 15° or less, such that the ramp has a constant slope between the first and second levels of the busbar. The ramp may ascend from the first level to the second level, or the ramp may descend from the first level to the second level in different embodiments.

Also disclosed herein is a battery electric system having a battery module, a power inverter, and a load. The battery module includes flexible cell tabs and one or more multi-level busbars, with the busbars being configured for interconnecting the flexible cell tabs within the battery module. The power inverter is connected to the battery module, with the load for its part being connected to the power inverter. In this embodiment, each busbar includes the first and second busbar surfaces noted above, along with the elongated step transition. That is, the first busbar surface is arranged on the first level of the multi-level busbar, and is welded to a first tab group of the flexible cell tabs. The second busbar surface is arranged on the second level of the multi-level busbar, and is welded to the second tab group of the flexible cell tabs. The step transition extends between the first and second levels, with the first and second tab groups overlap along the elongated step transition.

An additional aspect of the subject disclosure includes a motor vehicle. The motor vehicle may include the above-summarized battery electric system, as well as an electric traction motor and road wheels. The electric traction motor is connected to and energized by the power inverter to generate a drive torque. The road wheels are connected to the electric traction motor, with the drive torque being operable for rotating the road wheels and thereby propelling the motor vehicle.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Figure 1:
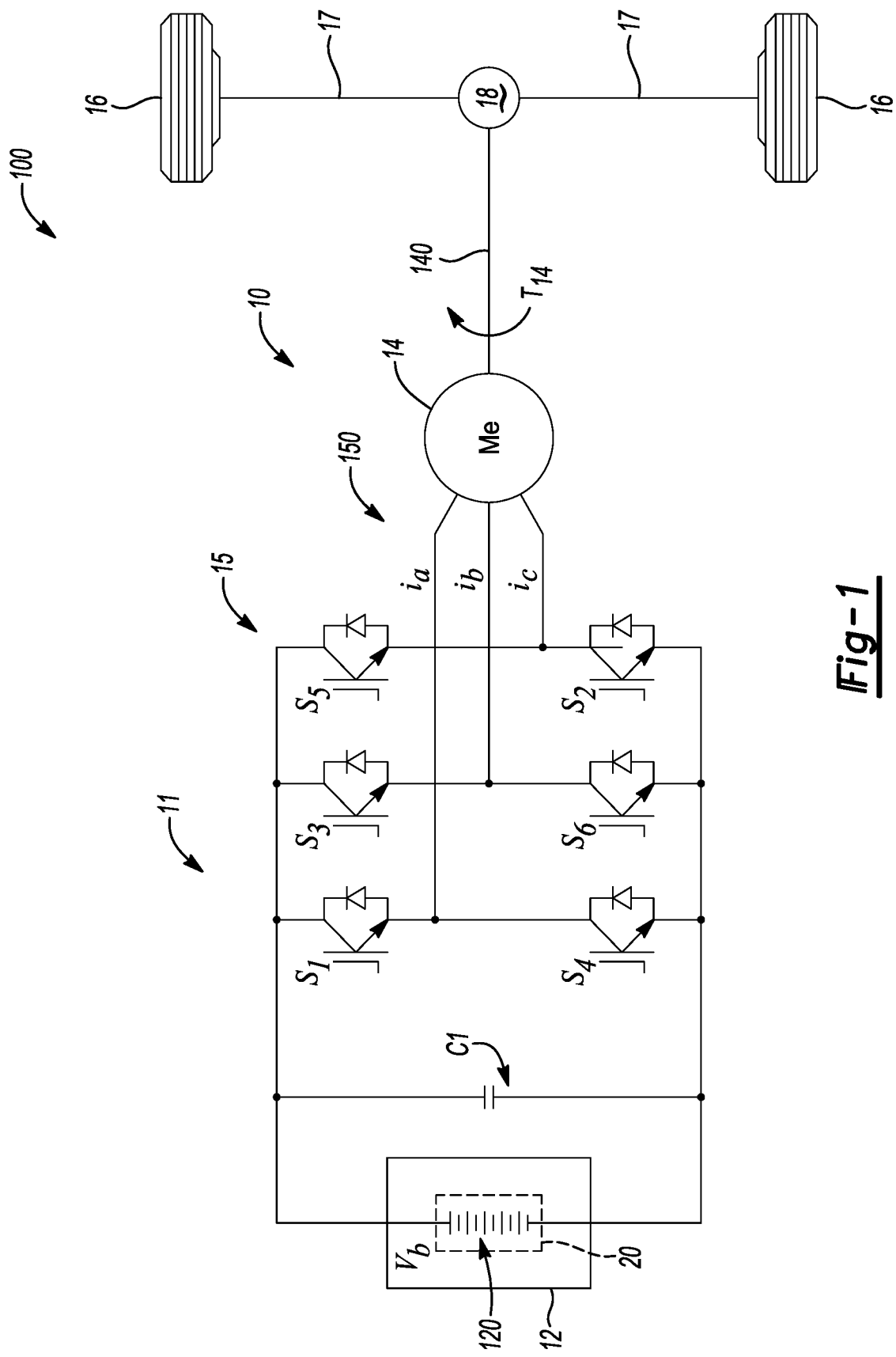
FIG. 1 is a schematic illustration of a representative motor vehicle having a battery electric system constructed using multi-level busbars as described herein.

Referring to the drawings, wherein like reference numerals correspond to like or similar components, and beginning with FIG. 1, an electrified powertrain system 10 includes a battery electric system 11 having a battery module 12. The battery module 12 in turn includes a busbar assembly 20 operable for conductively joining a plurality of electrochemical battery cells 120, e.g., of a lithium-ion, nickel metal-hydride, or other application-suitable battery chemistry. The constituent battery cells 120 of the battery module 12 are electrically interconnected using multi-level busbars 26 of the busbar assembly 20, with examples of the busbars 26 shown in FIGS. 2, 3, and 7, with alternative embodiments depicted in FIGS. 4A, 4B, 5, and 6. The battery module 12 ultimately provides a battery voltage ($V_b$) to a connected load as part of the battery electric system 11, with the battery voltage ($V_b$) being application-specific and based on the number and construction of the battery cells 120.

In a non-limiting application, the battery electric system 11 may be used as part of the electrified powertrain system 10, e.g., of a motor vehicle 100, a rail vehicle, watercraft or boat, or an aircraft, or possibly a stationary system such as a powerplant, hoist, or conveyor equipment. In the illustrated exemplary embodiment shown in FIG. 1, the battery electric system 11 may operate as a direct current (DC) power supply for energizing individual phase windings 150 of a rotary electric machine (Me) 14. For a simplified three-phase configuration of the rotary electric machine 14, for instance, the phase windings 150 are configured to conduct respective phase currents $i_a$, $i_b$, and $i_c$, in this instance using a nominal abc labeling convention. The battery module 12 is connected to the rotary electric machine 14 via a power inverter 15, with the power inverter 15 including a DC link capacitor C1 and semiconductor switches $S_1$, $S_2$, $S_3$, $S_4$, $S_5$, and $S_6$, with the switches typically embodied as IGBTs are shown, or as MOSFETs, SCRs, etc.

As appreciated in the art, high-speed ON/OFF switching control of the semiconductor switches $S_1$, $S_2$, $S_3$, $S_4$, $S_5$, and $S_6$ of the power inverter 15 is performed using pulse-width or pulse-density modulation techniques as appreciated in the art. Switching control in turn generates a polyphase/alternating current (AC) output voltage suitable for energizing the rotary electric machine 14 and causing rotation thereof. Once energized in this manner by the battery module 12 and operation of the power inverter 15, the rotary electric machine 14 generates drive torque (arrow $T_{14}$), with the drive torque (arrow $T_{14}$) transmitted by a rotatable output member 140 to one or more road wheels 16. The road wheels 16 in turn are disposed on one or more drive axles 17 in the illustrated embodiments, with the drive axles 17 possibly coupled via an electronic or mechanical differential 18 of the type understood in the art. The rotary electric machine 14 is thus configured to function as an electric traction or propulsion motor of the motor vehicle 100, with the battery module 12 configured as a constituent component of a high-energy propulsion battery pack.

Figure 2:
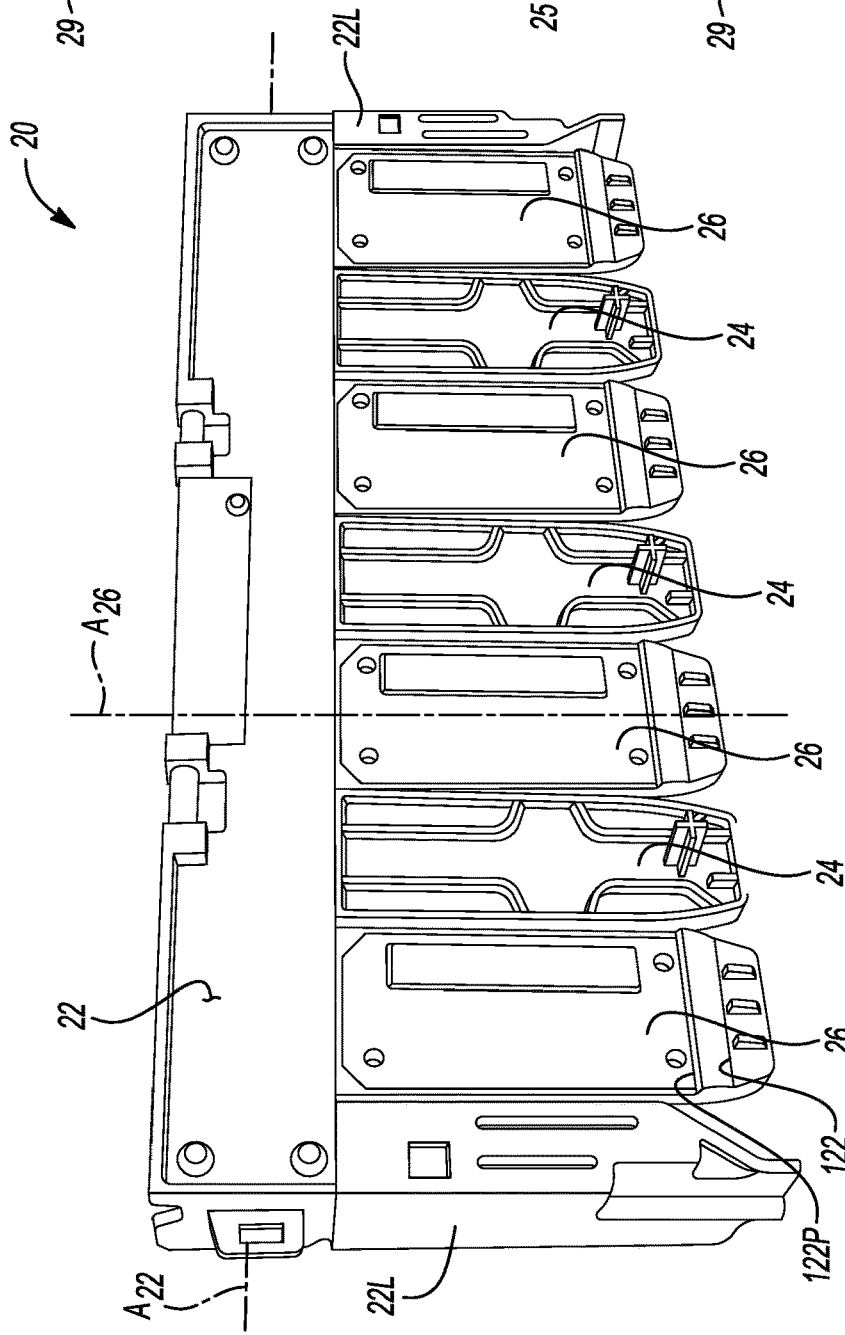
FIG. 2 is a perspective view illustration of exemplary multi-level busbars arranged on a mounting surface of a battery module, with the battery module being usable as part of the exemplary battery electric system shown in FIG. 1.

Referring to FIG. 2, the above-noted busbar assembly 20 may include a frame rail 22 having lateral walls 22L and a longitudinal axis $A_{22}$. The frame rail 22 may be constructed of molded plastic or another lightweight dielectric material. In a possible implementation, busbar mounts 122 each defining a respective distal end pocket 122P are integrally formed with the frame rail 22, with the busbar mounts 122 having a respective axis $A_{26}$ arranged perpendicular to the longitudinal axis $A_{22}$ of the frame rail 22. Interposed with the individual busbar mounts 122 are structural spacers 24, such that each respective busbar mount 122 is disposed adjacent to at least one structural spacer 24. In the illustrated pre-welded state of FIG. 2, the multi-level busbars 26 are supported by a respective one of the busbar mounts 122, with the busbar mounts 122 in turn receiving therein and securely cradling the busbars 26, e.g., an end portion 28 thereof as shown in FIG. 3, in preparation for welding of the busbars 26 to the individual battery cells 120 of FIG. 1.

Figure 3:
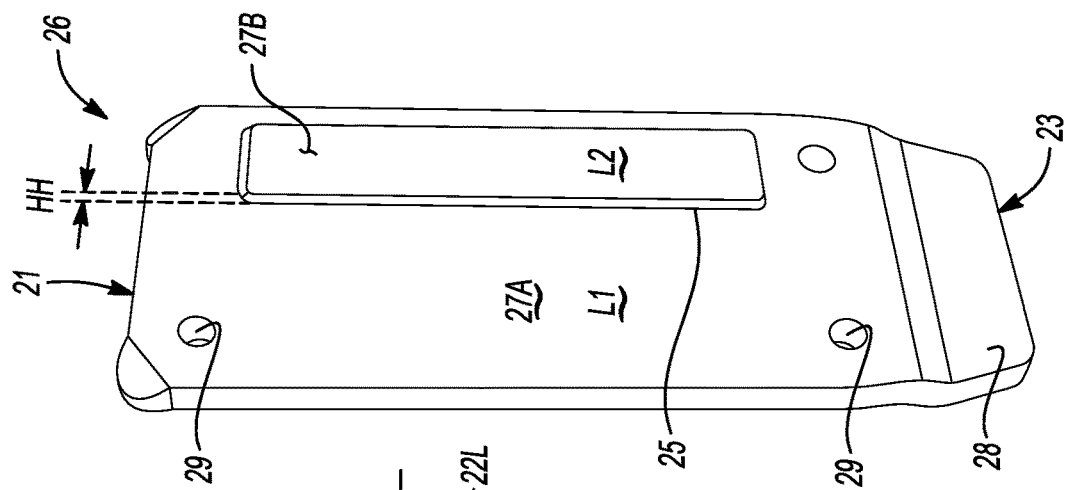
FIG. 3 is a perspective view illustration of a multi-level busbar according to a possible embodiment in which the busbar presents parallel busbar surfaces.
Figure 4A:
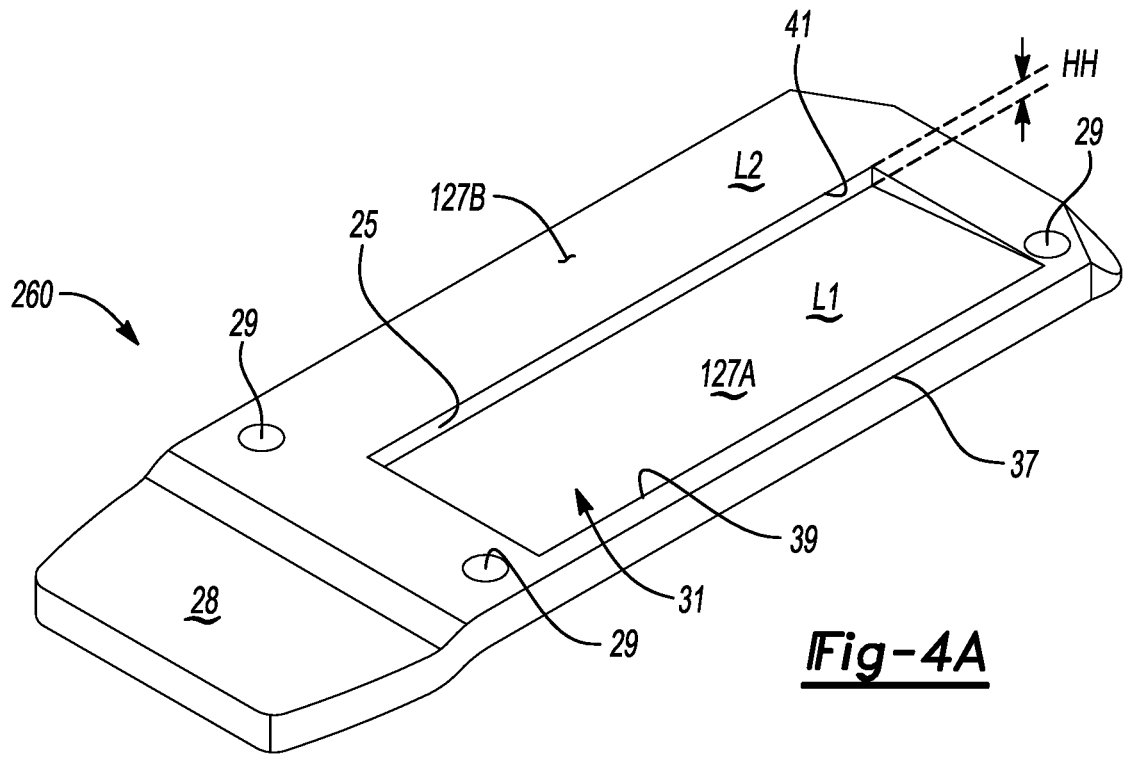
FIGS. 4A and 4B respectively depict alternative negative and positive ramped variations of the multi-level busbar shown in FIG. 3.
Figure 4B:
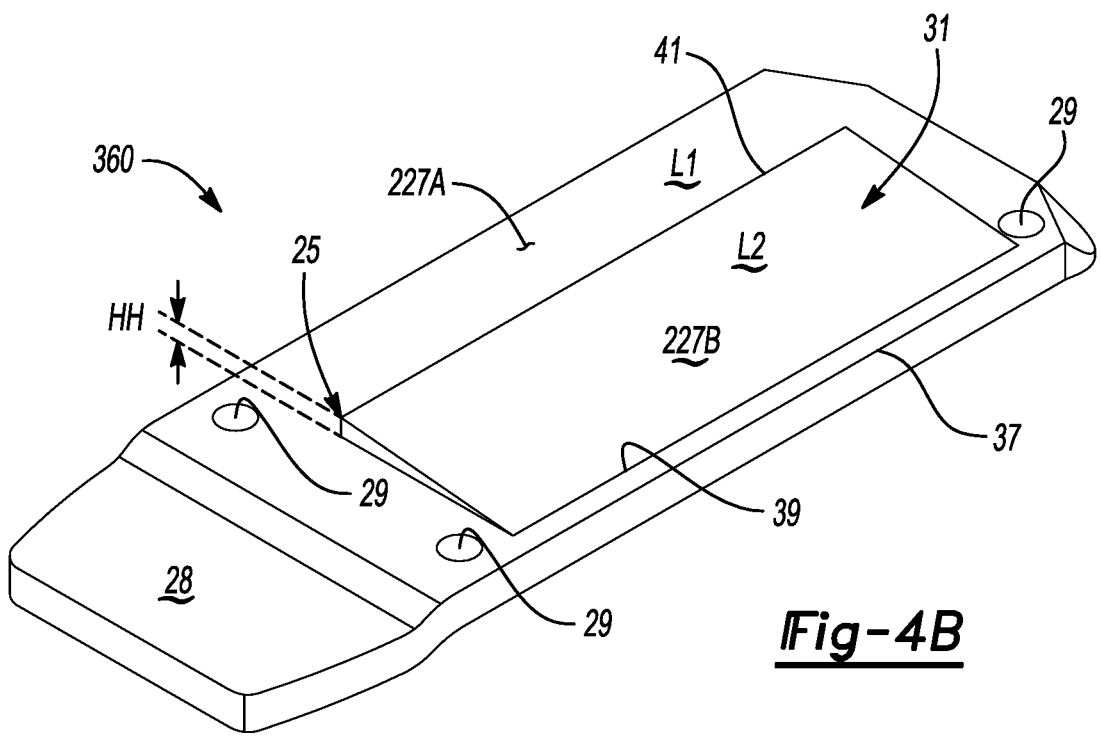
Figure 5:
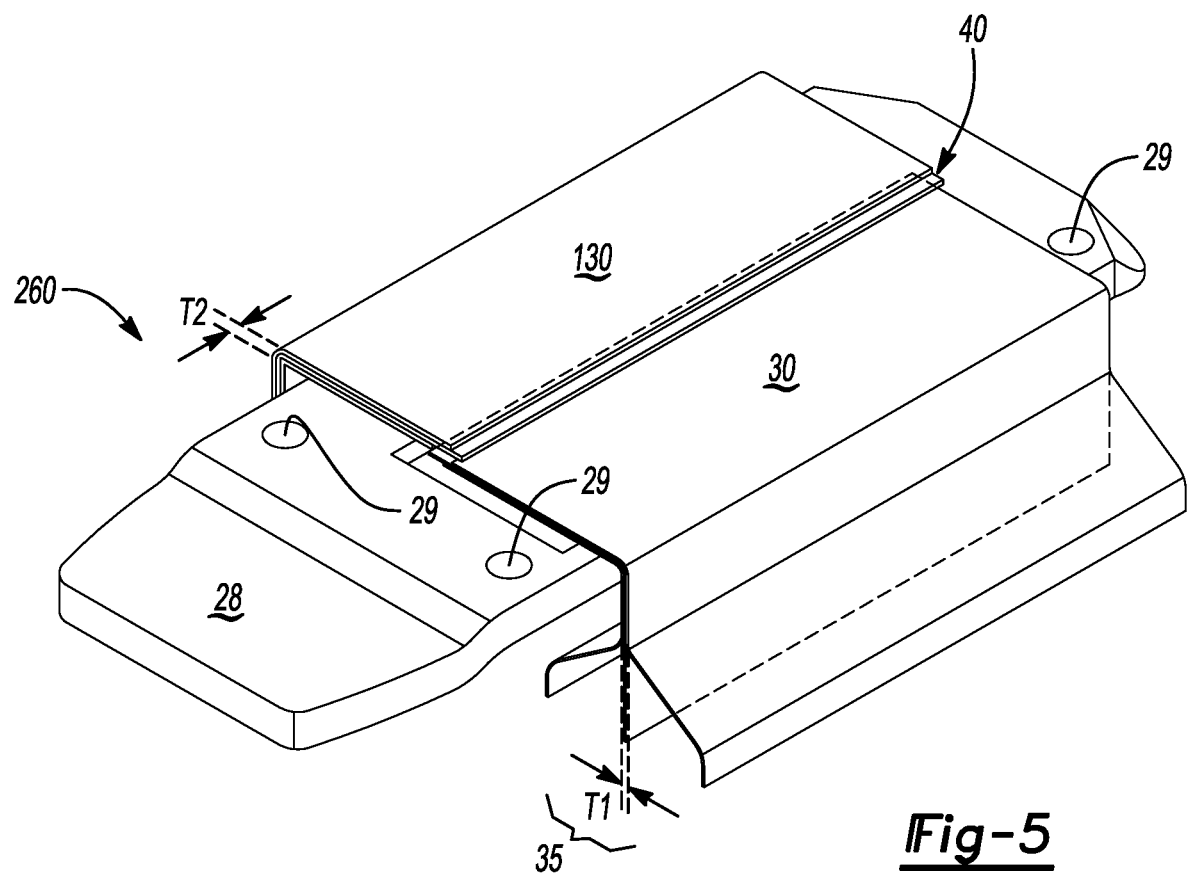
FIG. 5 illustrates the multi-level busbar of FIG. 5A, with flexible cell tabs ultimately folded thereagainst and welded thereto in an overlapping arrangement.

Referring now to FIG. 3, each of the multi-level busbars 26 of FIG. 2 is suitable for interconnecting flexible cell tabs 35, an example of which is shown in FIG. 5 and described below. As noted above, the flexible cell tabs 35 contemplated herein are thin electrode extensions of the battery cells 120 located within the battery module 12 of FIG. 1. Each busbar 26, as well as the alternative busbar 260 of FIGS. 4A and 5 and the alternative busbar 360 of FIG. 4B, includes a first busbar surface 27A arranged at a first level (L1) of the busbar 26. The first busbar surface 27A/first level L1 is weldable to a first tab group 30 of the flexible cell tabs 35 (see FIG. 5), e.g., using a laser welding process. A second busbar surface 27B is arranged at a higher second level L2 of the busbar 26, with comparable second busbar surfaces 127B and 227B shown in FIGS. 4A and 4B, respectively. Second busbar surfaces 27B, 127B, and 227B, with the latter being the counterpart of a first busbar surface 227A, are configured to be welded to a second tab group 130 of the flexible cell tabs 35 depicted in FIG. 5, i.e., by presenting flat surfaces with sufficient surface area for folding of the flexible cell tabs 35 and for the subsequent welding process.

Figure 6:
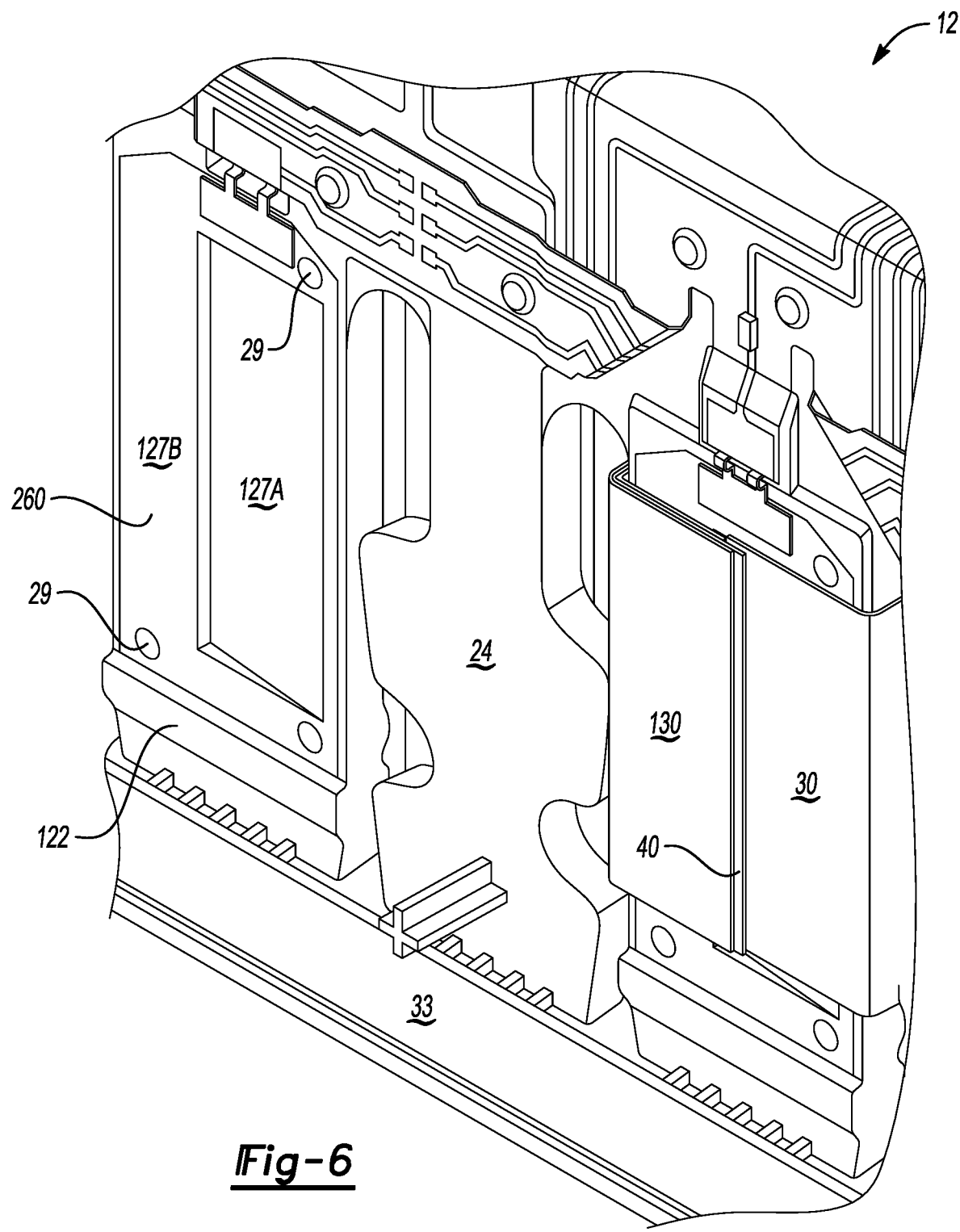
FIG. 6 is a perspective view illustration of a portion of the battery module of FIG. 1 showing the exemplary multi-level busbar embodiment of FIGS. 4A and 5.

Further with respect to the non-limiting embodiment of the multi-level busbar 26 shown in FIG. 3, an elongated step transition 25 is present/extends between the first level L1 and the second level L2, thus separating the respective first and second levels L1 and L2 from each other. The first busbar surface 27A is arranged parallel to the second busbar surface 27B in the embodiment of FIG. 3. The elongated step transition 25 separating the parallel levels L1 and L2 has a height dimension (HH) that is configured to allow the first tab group 30 and the second tab group 130 exemplified in FIG. 5 to overlap when the respective first and second tab groups 30 and 130 are folded against and ultimately welded to the busbar 26. A representative tab overlap region 40 indicative of the contemplated overlap tolerance is depicted in FIGS. 5 and 6.

Referring briefly to FIG. 5, attendant benefits to the illustrated construction include greater trim length tolerances of the flexible cell tabs 35, along within increased assembly and positioning tolerances. In an embodiment, the first tab group 30, e.g., a plurality or stack of flexible copper electrode extensions, has a first thickness T1. The second tab group 130 in this embodiment is constructed of flexible nickel-plated aluminum electrode extensions, and has a second thickness T2. The height dimension HH exceeds a larger of the respective first and second thickness T1 and T2, in this case the second tab group 130.

The larger of the first and second thickness T1 and T2 is less than about 3 mm in a typical embodiment, although thicker cell tabs 35 may be used in other configurations. In an embodiment using copper and aluminum cell tabs 35, the cell tabs 35 constructed of aluminum may be positioned on level L2, i.e., the higher of the two presented levels or tiers, with the aluminum cell tabs 35 of group 130 folded over the copper cell tabs 35 of group 30 located on level L1. Such an embodiment would help reduce undesirable springback that could result if cell tabs 35 constructed of aluminum were to be overlapped by the cells tabs 35 constructed of copper, i.e., due to the different mechanical properties of aluminum and copper.

Turning once again to FIG. 3, a top edge 21 of the multi-level busbar 26 is positioned adjacent to the frame rail 22 of FIG. 2. A bottom edge 23 of the busbar 26, located diametrically opposite the top edge 21, may be enclosed within the distal end pocket 122P of a respective busbar mount 122, as depicted in FIG. 2. Through-holes 29 in the first level L1 of the busbar 26 enable the busbar 26 to be securely fastened to the busbar mounts 122 of FIG. 2 or another suitable mounting surface of the battery module 12, e.g., using rivets or threaded fasteners (not shown).

An alternative construction of the multi-level busbar 26 of FIG. 3 is shown in FIG. 4A as the multi-level busbar 260. The busbar 260 in this embodiment utilizes a ramp 31 with a constant slope in lieu of an instantaneous/discrete transition between levels L1 and L2. In FIG. 4A, the ramp 31 presents a negative/descending slope starting at level L2, which is the highest level of the busbar 260 along its perimeter edge 37, and terminating at the lowest level, i.e., L1. That is, the second busbar surface 127B at level L2 is separated from the first busbar surface 127A and level L1 by the height dimension (HH). The ramp 31 descends at a constant slope from a leading edge 39 of the ramp 31, and ending at a terminal edge 41 of the ramp 31 along a base of the elongated step transition 25.

While the negative ramp of FIG. 4A is one possible construction, those skilled in the art will appreciate that a positive/ascending orientation of the ramp 31 may be used. An example of this alternative arrangement is shown in FIG. 4B, i.e., with the ramp 31 rising from the leading edge 39 at level L1 and ending at the terminal edge 41 at the highest level of the busbar 260, i.e., level L2. As with FIG. 4A, the two levels L1 and L2 are separated by the height dimension HH.

As contemplated herein, the ramps 31 of FIGS. 4A and 4B provide an increased amount of flat surface area for the cell tabs 35 of FIG. 5 to contact the multi-level busbars 260 and 360, and thus a maximum area for forming larger welds or repairing the same. Likewise, the ramps 31 provide a smooth continuous level transition from the perimeter edge 37 of the busbars 260 and 360, with the perimeter edge 37 being at the same level or on the same plane as the leading edge 39. This constant slope transition and setback from the perimeter edge in turn enables injection mold tooling (not shown) to have the proper area around the busbars 260 and 360 of FIGS. 4A and 4B for closing out such tooling, thus managing mold flash, as understood in the art.

Figure 7:
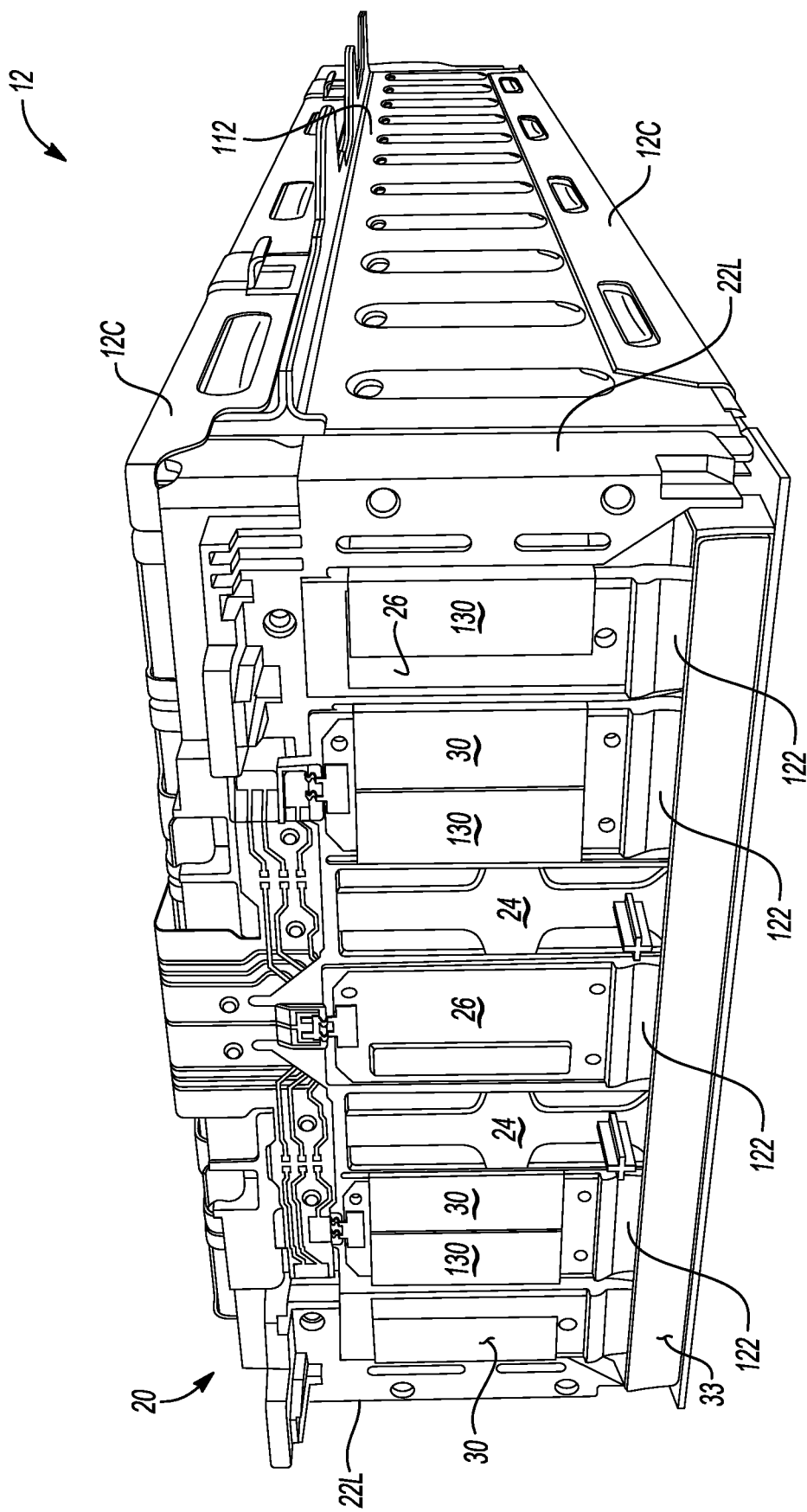
FIG. 7 is a perspective view illustration of a representative battery module with installed multi-level busbars.

Ultimately, the busbar assembly 20 of FIG. 2 may be constructed using the various embodiments of the multi-level busbar 26 described herein and integrated into the battery module 12 of FIG. 1. An exemplary embodiment of the battery module 12 is illustrated in FIGS. 6 and 7. In FIG. 6, one busbar 260 is shown as it would appear without accompanying first and second tab groups 30 and 130, with an adjacent busbar 260 separated by an intervening structural spacer 24 having the overlapping tab groups 30 and 130. As best shown in FIG. 7, the various busbar mounts 122 are arranged within a tray 33 of the battery module 12 and secured between oppositely disposed battery covers 12C as best shown in FIG. 7. The battery covers 12C in turn are connected to and supported by side walls 112 of the battery module 12 to form a strong box-like construction of the battery module 12. The battery module 12 of such a construction may then be used as part of the battery electric system 11 of FIG. 1 in a myriad of beneficial applications, including but not limited to the exemplary motor vehicle 100 described above.

The present teachings thus enable different multi-level constructions for conductive battery busbars. This in turn facilitates connection of apposing flexible electrode extensions due to the presentation of flat or ramped welding surfaces, in a manner that allows the cell tabs to overlap when the cell tabs have been folded onto the busbars from opposite sides of the busbars. The present teachings benefit the art of battery manufacturing for battery electric vehicles and other high-energy systems by enabling the use of longer cell tabs, tolerances for overlap, and reduced interference, unlike busbar constructions presenting a single flat welding surface. These and other attendant benefits, including a reduced scrap rate due to a reduced need to trim the cell tabs 35 described herein, will be readily appreciated by those of ordinary skill in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A multi-level busbar for interconnecting flexible cell tabs within a battery module of a battery electric system, comprising:
   a first busbar surface arranged at a first level of the multi-level busbar, and welded to a first tab group of the flexible cell tabs;
   a second busbar surface arranged at a second level of the multi-level busbar, and welded to a second tab group of the flexible cell tabs; and
   an elongated step transition that extends between the first level and the second level, wherein the elongated step transition has a height dimension that allows the first tab group and the second tab group to overlap when the first tab group and the second tab group are folded onto the multi-level busbar.

2. The multi-level busbar of claim 1, wherein the first tab group has a first thickness, the second tab group has a second thickness, and the height dimension of the elongated step transition exceeds a larger of the first thickness and the second thickness.

3. The multi-level busbar of claim 2, wherein the larger of the first thickness and the second thickness is less than about 3 mm.

4. The multi-level busbar of claim 1, wherein the first busbar surface defines a plurality of through-holes configured for mounting the multi-level busbar to a mounting surface of the battery module.

5. The multi-level busbar of claim 1, wherein the first busbar surface is arranged parallel to the second busbar surface; the second level is higher than the first level, and the first busbar surface extends around an entire outer perimeter of the second busbar surface.

6. The multi-level busbar of claim 1, wherein the multi-level busbar is constructed of copper.

7. The multi-level busbar of claim 1, wherein the first busbar surface is arranged at an angle with respect to the second busbar surface to form a ramp having a constant slope between the first level and the second level; and
   wherein either the first level is higher than the second level and the first busbar surface extends around an entire outer perimeter of second busbar surface, or the second level is higher than the first level and the second busbar surface extends around an entire outer perimeter of the first busbar surface.

8. The multi-level busbar of claim 7, wherein the ramp ascends at the constant slope from the first level to the second level.

9. The multi-level busbar of claim 7, wherein the ramp descends at the constant slope from the first level to the second level.

10. A battery electric system comprising:
    a battery module having flexible cell tabs and one or more multi-level busbars configured for interconnecting the flexible cell tabs within the battery module;
    a power inverter connected to the battery module; and
    a load connected to the power inverter, wherein each respective one of the multi-level busbar comprises:
      a first busbar surface arranged at a first level of the multi-level busbar, and welded to a first tab group of the flexible cell tabs, the first tab group being folded onto the first busbar surface;
      a second busbar surface arranged at a second level of the multi-level busbar, and welded to a second tab group of the flexible cell tabs, the second tab group being folded onto the second busbar surface; and
      an elongated step transition between the first level and the second level, wherein the first tab group and the second tab group overlap along the elongated step transition such that either the first tab group directly overlies the second tab group or the second tab group directly overlies the first tab group.

11. The battery electric system of claim 10, wherein the first tab group has a first thickness, the second tab group has a second thickness, and a height dimension of the elongated step transition exceeds a larger of the first thickness and the second thickness.

12. The battery electric system of claim 11, wherein the larger of the first thickness and the second thickness is less than about 3 mm.

13. The battery electric system of claim 11, wherein the first tab group is constructed of copper and the second tab group is constructed of nickel-plated aluminum, or the first tab group is constructed of nickel-plated aluminum and the second tab group is constructed of copper.

14. The battery electric system of claim 10, further comprising a rotary electric machine, wherein the load includes the rotary electric machine.

15. The battery electric system of claim 10, wherein the first busbar surface is parallel to the second busbar surface.

16. The battery electric system of claim 10, wherein the first busbar surface is arranged at an angle with respect to the second busbar surface to form a ramp having a constant slope between the first level and the second level.

17. The battery electric system of claim 16, wherein the ramp ascends at the constant slope from the first level to the second level.

18. The battery electric system of claim 16, wherein the ramp descends at the constant slope from the first level to the second level.

19. A motor vehicle comprising:
    a battery electric system having:
      a battery module having flexible cell tabs and one or more multi-level busbars configured for interconnecting the flexible cell tabs within the battery module; and
      a power inverter connected to the battery module;
    an electric traction motor connected to and energized by the power inverter to generate a drive torque; and
    road wheels connected to the electric traction motor, wherein the drive torque is operable for rotating the road wheels and thereby propelling the motor vehicle, wherein each respective one of the multi-level busbar comprises:
      a first busbar surface arranged at a first level of the multi-level busbar, and welded to a first tab group of the flexible cell tabs, the first tab group having a first thickness;
      a second busbar surface arranged at a second level of the multi-level busbar, and welded to a second tab group of the flexible cell tabs, the second tab group having a second thickness; and
      an elongated step transition between the first level and the second level, wherein the first tab group and the second tab group overlap along the elongated step transition, and the elongated step transition has a height dimension that exceeds a larger of the first thickness and the second thickness such that either the first tab group directly overlies the second tab group or the second tab group directly overlies the first tab group; and
      wherein either the first level is higher than the second level and the first busbar surface extends around an entire outer perimeter of second busbar surface, or the second level is higher than the first level and the second busbar surface extends around an entire outer perimeter of the first busbar surface.

20. The motor vehicle of claim 19, wherein the first busbar surface is arranged at an angle with respect to the second busbar surface to form a ramp having a constant slope between the first level and the second level.

\* \* \* \* \*